United States Patent Office 2,947,076
Patented Aug. 2, 1960

2,947,076

MANUFACTURE OF TURBINE BLADES

George O. Eccles, Barrowford, and Nelson Hector Kent, Allestree, England, assignors to Rolls-Royce Limited, Derby, England, a British company No Drawing. Filed Dec. 13, 1957, Ser. No. 702,519

Claims priority, application Great Britain Dec. 21, 1956

1 Claim. (Cl. 29—424)

This application is a continuation in part of our co-pending United States patent application Serial No. 689,440, filed October 10, 1957.

This invention is for a modification of and an improvement in the method of the manufacture of blades and particularly turbine blades for internal combustion turbine engines from metals which are resistant to high temperature such as nickel chrome alloys described and claimed in the said co-pending U.S. application Serial No. 689,440 herein called the parent application.

In that application there is described a method of forming a turbine blade for internal combustion engines from metals which are resistant to high temperatures which includes the following steps:

(a) Producing a billet,
(b) Drilling a plurality of holes axially of the billet,
(c) Inserting filler material into the drilled holes,
(d) Partially extruding the billet in a die, with lubrication, by pressure exerted substantially along one diameter only of each of the said drilled holes thereby to produce a blade section of approximate aerodynamic form leaving an integral portion of the billet remaining to form the root-fixing portion, said holes thereby being deformed in the profile portion to be of elongated or lenticular cross-section,
(e) Twisting the profile portion to give the required angle of incidence,
(f) Machining the blade profile portion to final shape and machining the root-fixing portion from the remaining non-extruded portion of the billet, and
(g) Removing said filler at a stage in the manufacturing process subsequent to extrusion.

The billet may be initially of substantially rectangular cross section in which case deformation during extrusion will take place substantially wholly between two opposite faces of the rectangular section.

The twisting of the profile portion of the blade may be carried out after extrusion or in the process of the extrusion.

Preferably the holes are blind holes which extend initially only through the blade portion of the billet and holes to register with them are drilled after extrusion through the root portion of the billet.

If desired an integral root platform may be formed on the blade. Where this platform is inclined the extrusion die will have a correspondingly inclined part and the billet will be formed by the extrusion with a complementary inclined surface. The blade profile portion may have a tip platform which can be in the form of a separate part welded to the blade profile. Alternatively, the extruded section may be upset axially at the tip to provide material for machining an integral tip platform.

Preferably a split die is used for the extrusion which will facilitate the extrusion by pressure in a single sense.

As filler material there may be used a low-carbon steel that is to say a steel containing 0.1% or less of carbon.

In the said application it is stated that a suitable lubrication for the billet during extrusion may be obtained by nickel plating the billet and/or by the use of powdered glass.

According to this invention in the carrying out of the method of forming a blade as described in our parent specification the billet is nickel plated and additionally graphite is applied to the extrusion die surface.

We have found that the adoption of the present invention greatly facilitates the forming of blades in accordance with the process described in the co-pending application.

Nickel-plating of billets of nickel-chrome alloys used in the production of turbine blades has been described and claimed in Rolls-Royce British Patent No. 749,909, published June 6, 1956.

In the adoption of the present invention the billet is preferably plated to a depth of 0.004 to 0.005", whilst the graphite is preferably applied to the extrusion die surface in a colloidal suspension, i.e. powdered graphite in a suitable lubricating oil.

We claim:

The method of extruding through a die a metal resistant to high temperatures which includes a substantial percentage of nickel and chromium comprising nickel-plating a billet of the metal to produce an adherent coating to at least a depth of the order of 0.004 inch which is extensible with the billet, coating the active surface of the die with a colloidal suspension of graphite in a lubricating liquid, extruding the billet through the die by pressure applied thereto in the axis of the major direction of extrusion and then removing said nickel coating.

References Cited in the file of this patent

UNITED STATES PATENTS

| 567,410 | Potter | Sept. 8, 1896 |
| 1,060,361 | Rea | Apr. 29, 1913 |
| 1,802,843 | Singer | Apr. 28, 1931 |
| 2,389,876 | Sequin | Nov. 27, 1945 |
| 2,588,625 | Ferner | Mar. 11, 1952 |
| 2,628,417 | Peyches | Feb. 17, 1953 |
| 2,712,688 | Steinmeyer | July 12, 1955 |
| 2,737,293 | Beliveau | Mar. 6, 1956 |

FOREIGN PATENTS

| 745,655 | Great Britain | Feb. 29, 1956 |
| 749,909 | Great Britain | June 6, 1956 |